(12) United States Patent
Chen et al.

(10) Patent No.: US 12,279,144 B2
(45) Date of Patent: Apr. 15, 2025

(54) RESOURCE ALLOCATION ENHANCEMENTS FOR SIDELINK COMMUNICATIONS

(71) Applicant: MediaTek Singapore Pte. Ltd., Singapore (SG)

(72) Inventors: Tao Chen, Beijing (CN); Lung-Sheng Tsai, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 328 days.

(21) Appl. No.: 17/578,406

(22) Filed: Jan. 18, 2022

(65) Prior Publication Data

US 2022/0232409 A1 Jul. 21, 2022

(30) Foreign Application Priority Data

Jan. 18, 2022 (CN) .......................... 202210056411.7

(51) Int. Cl.
*H04W 24/10* (2009.01)
*H04B 17/318* (2015.01)
*H04W 28/26* (2009.01)
*H04W 72/02* (2009.01)
*H04W 72/20* (2023.01)
*H04W 72/56* (2023.01)

(52) U.S. Cl.
CPC .......... *H04W 24/10* (2013.01); *H04B 17/318* (2015.01); *H04W 28/26* (2013.01); *H04W 72/02* (2013.01); *H04W 72/20* (2023.01); *H04W 72/56* (2023.01)

(58) Field of Classification Search
CPC ... H04B 17/318; H04B 17/327; H04W 24/08; H04W 24/10; H04W 28/26; H04W 72/02; H04W 72/20; H04W 72/56; H04W 92/18
See application file for complete search history.

(56) References Cited

U.S. PATENT DOCUMENTS

| 11,539,475 B2 * | 12/2022 | Park ...................... H04L 1/1864 |
| 11,991,000 B2 * | 5/2024 | Lee ........................ H04W 72/02 |
| 12,082,192 B2 * | 9/2024 | Hoang ................ H04W 74/085 |
| 2018/0049143 A1 | 2/2018 | Gupta et al. |

(Continued)

FOREIGN PATENT DOCUMENTS

| CN | 108024230 A | 5/2018 |
| CN | 110832896 A | 2/2020 |

OTHER PUBLICATIONS

Taiwan Intellectual Property Office, Office Action for Taiwan Patent Application No. 111102174, May 10, 2022.

(Continued)

*Primary Examiner* — Dung B Huynh
(74) *Attorney, Agent, or Firm* — Andy M. Han; Han IP PLLC

(57) ABSTRACT

Various examples and schemes pertaining to resource allocation enhancements for sidelink (SL) communications are described. A user equipment (UE) receives from a peer UE a sidelink control information (SCI) signal indicating a reserved resource. The UE then determines whether the reserved resource is acceptable by performing a reference signal received power (RSRP)-based comparison. Depending on a result of the determining, the UE performs a transmission to either the peer UE or one or more other UEs.

14 Claims, 4 Drawing Sheets

(56) References Cited

U.S. PATENT DOCUMENTS

| | | | |
|---|---|---|---|
| 2018/0279094 A1* | 9/2018 | Blasco Serrano | H04W 72/04 |
| 2019/0132832 A1* | 5/2019 | Uchiyama | H04W 72/56 |
| 2019/0306835 A1* | 10/2019 | Hoang | H04W 72/53 |
| 2019/0306923 A1* | 10/2019 | Xiong | H04J 13/0062 |
| 2020/0092685 A1* | 3/2020 | Fehrenbach | H04W 76/14 |
| 2020/0235848 A1* | 7/2020 | Nguyen | H04L 1/0038 |
| 2020/0351032 A1* | 11/2020 | Wu | H04W 72/56 |
| 2020/0351033 A1* | 11/2020 | Ryu | H04L 1/1861 |
| 2020/0396719 A1* | 12/2020 | Sheu | H04W 72/02 |
| 2021/0051525 A1* | 2/2021 | Cao | H04W 76/14 |
| 2021/0051600 A1* | 2/2021 | Fakoorian | H04W 72/23 |
| 2021/0058899 A1* | 2/2021 | Lee | H04W 52/146 |
| 2021/0105104 A1* | 4/2021 | Cao | H04L 1/1861 |
| 2021/0105817 A1* | 4/2021 | Nguyen | H04W 74/0816 |
| 2021/0127361 A1* | 4/2021 | Yasukawa | H04W 4/70 |
| 2021/0144726 A1* | 5/2021 | Hui | H04B 17/318 |
| 2021/0144750 A1* | 5/2021 | Cao | H04W 72/0453 |
| 2021/0168803 A1* | 6/2021 | Wu | H04L 5/0053 |
| 2021/0212026 A1* | 7/2021 | Peng | H04W 72/02 |
| 2021/0219320 A1* | 7/2021 | Belleschi | H04W 72/20 |
| 2021/0266951 A1* | 8/2021 | Gulati | H04B 17/327 |
| 2021/0315024 A1* | 10/2021 | Sarkis | H04L 5/0037 |
| 2021/0328639 A1* | 10/2021 | Karakkad Kesavan Namboodiri | H04B 7/0695 |
| 2021/0360671 A1* | 11/2021 | Sarkis | H04W 76/14 |
| 2021/0385697 A1* | 12/2021 | Yang | H04W 72/0453 |
| 2021/0392547 A1* | 12/2021 | Tang | H04W 28/16 |
| 2022/0022179 A1* | 1/2022 | Fouad | H04J 13/0062 |
| 2022/0030612 A1* | 1/2022 | Balasubramanian | H04W 72/02 |
| 2022/0046430 A1* | 2/2022 | Liu | H04B 7/0695 |
| 2022/0046663 A1* | 2/2022 | Yang | H04W 72/02 |
| 2022/0053498 A1* | 2/2022 | Wang | H04W 72/02 |
| 2022/0070848 A1* | 3/2022 | Liu | H04B 7/0617 |
| 2022/0095171 A1* | 3/2022 | Hosseini | H04W 72/02 |
| 2022/0095280 A1* | 3/2022 | Farag | H04W 28/26 |
| 2022/0110067 A1* | 4/2022 | Ryu | H04W 24/08 |
| 2022/0124018 A1* | 4/2022 | Nguyen | H04L 5/0055 |
| 2022/0132469 A1* | 4/2022 | Aktas | H04W 72/02 |
| 2022/0132514 A1* | 4/2022 | Nguyen | H04W 72/541 |
| 2022/0167376 A1* | 5/2022 | Ryu | H04W 72/1263 |
| 2022/0167414 A1* | 5/2022 | Levitsky | H04W 8/24 |
| 2022/0182985 A1* | 6/2022 | Ding | H04W 72/542 |
| 2022/0191718 A1* | 6/2022 | Wang | H04W 24/10 |
| 2022/0191744 A1* | 6/2022 | Nguyen | H04W 72/20 |
| 2022/0191827 A1* | 6/2022 | Balasubramanian | H04W 72/02 |
| 2022/0201557 A1* | 6/2022 | Wang | H04W 72/0446 |
| 2022/0201667 A1* | 6/2022 | Wang | H04W 74/0816 |
| 2022/0225160 A1* | 7/2022 | Sarkis | H04W 72/30 |
| 2022/0232519 A1* | 7/2022 | Nguyen | H04W 72/20 |
| 2022/0256518 A1* | 8/2022 | Hou | H04L 1/1825 |
| 2022/0330038 A1* | 10/2022 | Ganesan | H04W 52/10 |
| 2022/0330281 A1* | 10/2022 | Lee | H04L 1/1896 |
| 2022/0337349 A1* | 10/2022 | Lee | H04L 1/1854 |
| 2022/0338129 A1* | 10/2022 | Sun | H04W 24/08 |
| 2022/0394675 A1* | 12/2022 | Zhou | H04W 74/0808 |
| 2022/0408413 A1* | 12/2022 | Tang | H04W 16/06 |
| 2022/0417872 A1* | 12/2022 | Ko | H04W 48/10 |
| 2022/0417923 A1* | 12/2022 | Uchiyama | H04W 4/40 |
| 2023/0036584 A1* | 2/2023 | Lee | H04L 1/1854 |
| 2023/0046738 A1* | 2/2023 | Lee | H04L 1/0013 |
| 2023/0050353 A1* | 2/2023 | Miao | H04W 74/0808 |
| 2023/0063472 A1* | 3/2023 | Freda | H04W 52/0232 |
| 2023/0084593 A1* | 3/2023 | Hoang | H04W 52/0225 370/311 |
| 2023/0131882 A1* | 4/2023 | Lin | H04W 72/0446 370/329 |
| 2023/0143285 A1* | 5/2023 | Li | H04W 76/14 370/329 |
| 2023/0171738 A1* | 6/2023 | Di Girolamo | H04W 72/20 370/329 |
| 2023/0171761 A1* | 6/2023 | Salim | H04W 72/563 370/329 |
| 2023/0180185 A1* | 6/2023 | Ye | H04W 74/0808 370/329 |
| 2023/0180186 A1* | 6/2023 | Ye | H04W 72/0446 370/329 |
| 2023/0189292 A1* | 6/2023 | Ganesan | H04W 76/11 370/329 |
| 2023/0199719 A1* | 6/2023 | Lee | H04L 1/1896 370/329 |
| 2023/0209388 A1* | 6/2023 | Hwang | H04W 28/0236 370/329 |
| 2023/0217287 A1* | 7/2023 | Son | H04B 17/364 370/329 |
| 2023/0224764 A1* | 7/2023 | Dutta | H04W 28/26 370/329 |
| 2023/0231654 A1* | 7/2023 | Ganesan | H04L 1/1887 370/329 |
| 2023/0247589 A1* | 8/2023 | Dong | H04W 24/10 370/329 |
| 2023/0247652 A1* | 8/2023 | Du | H04W 72/25 370/329 |
| 2023/0247654 A1* | 8/2023 | Zhang | H04L 5/0092 370/329 |
| 2023/0254817 A1* | 8/2023 | Zhao | H04B 17/328 370/329 |
| 2023/0261801 A1* | 8/2023 | Fu | H04L 1/00 370/329 |
| 2023/0262606 A1* | 8/2023 | Hui | H04W 52/0277 370/311 |
| 2023/0262665 A1* | 8/2023 | Zhao | H04W 72/044 370/330 |
| 2023/0292342 A1* | 9/2023 | Lee | H04W 72/02 |
| 2023/0292347 A1* | 9/2023 | Salim | H04W 72/02 |
| 2023/0300799 A1* | 9/2023 | Lee | H04W 72/02 |
| 2023/0309066 A1* | 9/2023 | Ganesan | H04L 5/0051 |
| 2023/0309134 A1* | 9/2023 | Leon Calvo | H04W 72/563 |
| 2023/0309161 A1* | 9/2023 | Rao | H04L 5/0048 |
| 2023/0318757 A1* | 10/2023 | Lee | H04L 1/08 370/329 |
| 2023/0319618 A1* | 10/2023 | Han | H04B 7/18504 370/252 |
| 2023/0319826 A1* | 10/2023 | Ryu | H04W 72/542 370/329 |
| 2023/0344610 A1* | 10/2023 | Yang | H04W 40/20 |
| 2023/0345309 A1* | 10/2023 | Zhao | H04W 76/23 |
| 2023/0345421 A1* | 10/2023 | Hui | H04W 72/563 |
| 2023/0345426 A1* | 10/2023 | Zhao | H04W 72/04 |
| 2023/0345510 A1* | 10/2023 | Zhang | H04W 72/02 |
| 2023/0345559 A1* | 10/2023 | Li | H04L 1/1812 |
| 2023/0354269 A1* | 11/2023 | Zhang | H04W 72/25 |
| 2023/0354376 A1* | 11/2023 | Chae | H04W 72/563 |
| 2023/0354386 A1* | 11/2023 | Hui | H04W 72/20 |
| 2023/0354388 A1* | 11/2023 | Ji | H04W 72/0446 |
| 2023/0361926 A1* | 11/2023 | Babaei | H04L 5/0048 |
| 2023/0370181 A1* | 11/2023 | Rydén | G06N 7/01 |
| 2023/0413299 A1* | 12/2023 | Lee | H04W 28/26 |
| 2024/0015550 A1* | 1/2024 | Parichehrehteroujeni | H04W 24/08 |
| 2024/0015755 A1* | 1/2024 | Pan | H04W 72/25 |
| 2024/0023069 A1* | 1/2024 | Hu | H04W 72/02 |
| 2024/0056233 A1* | 2/2024 | Kim | H04L 5/00 |
| 2024/0056997 A1* | 2/2024 | Hoang | H04W 56/0015 |
| 2024/0057121 A1* | 2/2024 | Ganesan | H04L 1/1854 |
| 2024/0057122 A1* | 2/2024 | Lee | H04W 72/25 |
| 2024/0063956 A1* | 2/2024 | Ko | H04L 1/188 |
| 2024/0090009 A1* | 3/2024 | Zhao | H04W 72/541 |
| 2024/0214940 A1* | 6/2024 | Zhang | H04W 52/0216 |
| 2024/0276521 A1* | 8/2024 | Ding | H04L 5/0051 |
| 2024/0340959 A1* | 10/2024 | Deng | H04W 74/002 |

OTHER PUBLICATIONS

China National Intellectual Property Administration, First Office Action in China Patent Application No. 202210056411.7, Dec. 19, 2024.

(56) References Cited

OTHER PUBLICATIONS

LG Electronics: "Discussion on resource allocation for Mode 2", 3GPP TSG RAN WG1 #99, R1-1912588, 2019-11-09, pp. 1-16.
SONY: "Discussion on NR V2X mode 2 resource allocation", 3GPP TSG RAN WG1 #97, R1-1906839, May 4, 2019, pp. 1-4.

* cited by examiner

RESOURCE ALLOCATION ENHANCEMENTS FOR SIDELINK COMMUNICATIONS

CROSS REFERENCE TO RELATED PATENT APPLICATION(S)

The present disclosure claims the priority benefit of China Patent Application No. 202210056411.7, filed 18 Jan. 2022, which is part of a China national stage application of PCT Application No. PCT/CN2021/072715, filed 19 Jan. 2021. Contents of aforementioned applications are herein incorporate by reference in their entirety.

TECHNICAL FIELD

The present disclosure is generally related to wireless communications and, more particularly, to resource allocation enhancements for sidelink (SL) communications.

BACKGROUND

Unless otherwise indicated herein, approaches described in this section are not prior art to the claims listed below and are not admitted as prior art by inclusion in this section.

Under the $3^{rd}$ Generation Partnership Project (3GPP) specification for $5^{th}$ Generation (5G) New Radio (NR), vehicle-to-everything (V2X) SL communications can be supported by unicast, groupcast and broadcast communications. However, there remain certain issues that need to be addressed with respect to SL resource allocation to improve reliability and reduce latency in SL communications. Therefore, there is a need for a solution of resource allocation enhancements for SL communications.

SUMMARY

The following summary is illustrative only and is not intended to be limiting in any way. That is, the following summary is provided to introduce concepts, highlights, benefits and advantages of the novel and non-obvious techniques described herein. Selected implementations are further described below in the detailed description. Thus, the following summary is not intended to identify essential features of the claimed subject matter, nor is it intended for use in determining the scope of the claimed subject matter.

One objective of the present disclosure is to propose various schemes, concepts, designs, methods, systems and apparatuses pertaining to resource allocation enhancements for SL communications. It is believed that various schemes proposed herein may improve reliability and reduce latency to address certain issues in 5G NR V2X communications. Under various proposed schemes in accordance with the present disclosure with respect to SL resource allocation, an assisted resource allocation mechanism may be applied by a receiving (Rx) user equipment (UE) to improve reliability and reduce overall latency for SL communications. This mechanism may be implemented independently or jointly with a transmitting (Tx) UE-based sensing and resource allocation mechanism. For instance, the Rx UE may transmit assistance information to assist the Tx UE in resource selection by the Tx UE. For the reserved resource(s) indicated in sidelink control information (SCI) from a peer Tx UE, the Rx UE may indicate that the resources are not preferred via certain signaling (e.g., one or more bits in a physical SL feedback channel (PSFCH)) to the peer Tx UE in case that the reserved resources are not preferred based on sensing results at the Rx UE. On the other hand, the Rx UE may transmit SCI carrying resource reservation information from the peer Tx UE to one or more potential interfering UEs for resource collision avoidance in case that the reserved resources are preferred or otherwise acceptable based on the sensing results at the Rx UE.

In one aspect, a method may involve receiving from a peer UE (e.g., peer Tx UE) an SCI signal indicating a reserved resource. The method may also involve determining whether the reserved resource is acceptable by performing a reference signal received power (RSRP)-based comparison. The method may further involve performing a transmission to either the peer UE or one or more other UEs depending on a result of the determining.

In another aspect, a method may involve transmitting to a peer UE (e.g., peer Rx UE) an SCI signal indicating a reserved resource. The method may also involve receiving from the peer UE an indication that the reserved resource is not preferred. The method may further involve performing resource selection or reselection responsive to receiving the indication.

In yet another aspect, an apparatus may include a transceiver configured to communicate wirelessly and a processor coupled to the transceiver. The processor may receive, via the transceiver, from a peer UE (e.g., peer Tx UE) an SCI signal indicating a reserved resource and determine whether the reserved resource is acceptable by performing a RSRP-based comparison. The processor may then perform, via the transceiver, a transmission to either the peer UE or one or more other UEs depending on a result of the determining.

It is noteworthy that, although description provided herein may be in the context of certain radio access technologies, networks and network topologies such as 5G/NR V2X, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Wireless Fidelity (Wi-Fi) and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to resource allocation enhancements for SL communications in NR V2X communications. According to the present disclosure, a number of possible solutions or schemes may be implemented separately or jointly. That is, although these possible solutions/schemes may be described below separately, two or more of these possible solutions/schemes may be implemented in one combination or another.

Figure 1:
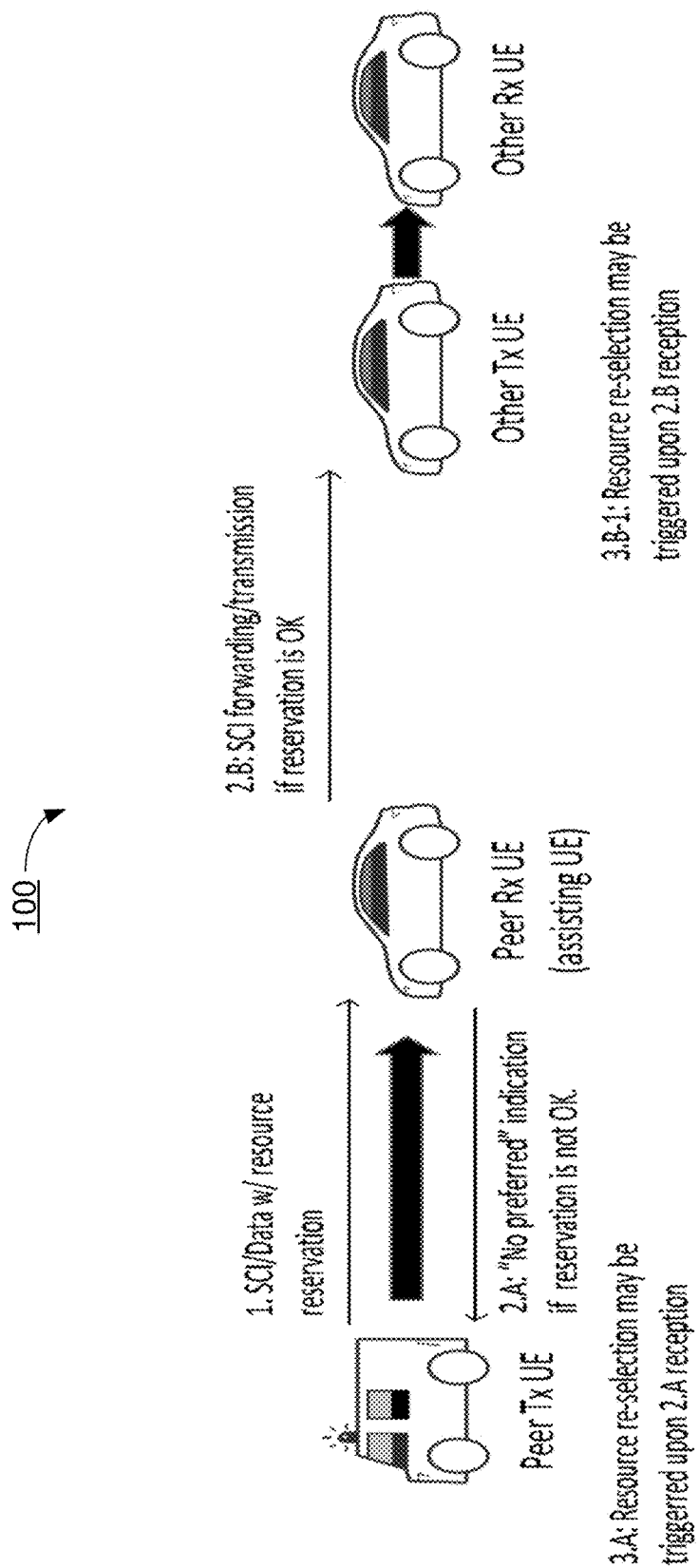
FIG. 1 is a diagram of an example communication environment in which various proposed schemes in accordance with the present disclosure may be implemented.

FIG. 1 illustrates an example network environment 100 in which various solutions and schemes in accordance with the present disclosure may be implemented. Referring to FIG. 1, network environment 100 may involve a Rx UE (herein interchangeably referred to as "peer Rx UE"), a Tx UE (herein interchangeably referred to as "peer Tx UE"), and one or more other UEs (herein interchangeably referred to as "potential interfering UEs" as they might potentially cause interference on the Rx UE with respect to receiving transmissions from the Tx UE) in wireless communication in an NR V2X network. In network environment 100, the Rx UE, the Tx UE and the one or more other UEs may implement various schemes pertaining to resource allocation enhancements for SL communications in accordance with the present disclosure, as described below.

Under various proposed schemes in accordance with the present disclosure with respect to SL resource allocation, an assisted resource allocation mechanism may be applied by the Rx UE to improve reliability and reduce overall latency for SL communications. This mechanism may be implemented independently or jointly with a Tx UE-based sensing and resource allocation mechanism. For instance, the Rx UE may transmit assistance information to assist the Tx UE in resource selection by the Tx UE. For the reserved resource(s) indicated in a SCI signal from a peer Tx UE, the Rx UE may indicate that the resources are not preferred via certain signaling (e.g., one or more bits in a PSFCH) to the peer Tx UE in case that the reserved resources are not preferred based on sensing results at the Rx UE. On the other hand, the Rx UE may transmit SCI carrying resource reservation information from the peer Tx UE to one or more potential interfering UEs for resource collision avoidance in case that the reserved resources are preferred or otherwise acceptable based on the sensing results at the Rx UE. It is noteworthy that the peer Tx UE may communicate with the peer Rx UE while one or more other Tx UEs communicate with one or more other Rx UEs. Accordingly, transmission(s) by the one or more other Tx UE to the one or more other Rx UEs may cause interference at the peer Rx UE in case there lacks efficient coordination between the peer Tx UE and the one or more other Tx UEs.

Under a proposed scheme in accordance with the present disclosure, an assisted resource allocation mechanism may encompass several stages, steps or operations, involving the peer Rx UE, the peer Tx UE, and one or more other UEs (e.g., one or more other Tx UEs and/or one or more other Rx UEs), denoted as Step 1, Step 2A, Step 2B, Step 3A, Step 3B-1 and Step 3B-2 in FIG. 1 and described below. Referring to FIG. 1, in Step 1, the peer Tx UE may send or transit to the peer Rx UE data associated with a control channel which may carry (e.g., in SCI) certain resource reservation information to indicate to the peer Rx UE the time and/or frequency resource(s) reserved by the peer Tx UE for future transmissions.

Upon receiving the SCI from the peer Tx UE, the peer Rx UE may check to determine whether the reserved time/frequency resource(s) indicated in the SCI is/are acceptable or preferred according to the peer Rx UE's sensing results from the past (e.g., historical sensing results). The sensing results may be results of the peer Rx UE performing channel sensing on a channel where transmissions from UEs (including the peer Tx UE) in network environment 100 occur to collect channel priority information and resource reservation information (obtained from SCI signal(s) received from any UE in network environment 100) as well as RSRP results measured on demodulation reference signals (DMRSs) of the received SCI signal(s) and/or the associated data DMRSs. That is, upon reception of the SCI from the peer Tx UE, the peer Rx UE may check the reserved resources as indicated in the SCI and compare the RSRP performances of the peer Tx UE and one or more other UEs (e.g., potential interfering UE(s)) with the same resource reservation according to the peer Rx UE's sensing results from the past.

For instance, in case the RSRP of the peer Tx UE is higher than the RSRP of the potential interfering UE(s), the resource(s) reserved by the peer Tx UE may be deemed by the peer Rx UE as "acceptable" or "preferred" from the perspective of the peer Rx UE. Otherwise, the reserved resource(s) may be deemed by the peer Rx UE as "unacceptable" or "non-preferred". Additionally, in comparing the RSRP performances, the peer Rx UE may take into account the priority levels between the peer Tx UE and the potential interfering UE(s). Moreover, an RSRP offset or threshold may be derived or (pre-)configured based on the priority levels of the peer Tx UE and the potential interfering UE(s). For a different pair of priority levels between the peer Tx UE and the potential interfering UE(s), the RSRP offset may be different. The peer Rx UE may determine a difference in RSRPs (hereinafter interchangeably referred to as "RSRP difference") of the peer Tx UE and the potential interfering UE(s) with an RSRP offset or threshold value, which may be derived from a function of the priority levels of the peer Tx UE and the potential interfering UE(s). In an event that the RSRP difference is higher (or lower) than the RSRP offset or threshold value, the reserved resource(s) may be deemed by the peer Rx UE as "acceptable" or "preferred". Otherwise, the reserved resource(s) may be deemed by the peer Rx UE as "unacceptable" or "non-preferred". Based on the determination of "preferred" or "non-preferred" regarding the reserved resource(s), the peer Rx UE may send or transmit assistance information to the peer Tx UE and/or the potential interfering UE(s).

Under the proposed scheme, in Step 2A, in case that the reserved resource(s) is/are deemed as "non-preferred", the peer Rx UE may send an indication of "non-preferred" (also known as "collision indication") to the peer Tx UE. Such indication (e.g., one bit or multiple bits) may be carried in the PSFCH from the peer Rx UE to the peer Tx UE. Additionally, there may or may not be multiplexing with an SL acknowledgement/negative acknowledgement (A/N) bit depending on the transmission timing and/or (pre-)configuration. In case of no multiplexing of such indication bit(s) with the A/N bit, the PSFCH may carry one of them (e.g., either but not both the indication(s) and the A/N bit) each time by using different time/frequency/sequence resources for differentiation. In case of multiplexing of the indication bit(s) with the A/N bit, the PSFCH may carry one or more additional bits each time (e.g., two bits with one bit for A/N and the other bit for "non-preferred" indication). In such cases, four PSFCH resources (sequences) may be required to indicate two bits of information. The PSFCH resources used for transmission may be determined by the peer Rx UE based on a function of the identifications (IDs) of source and/or destination UE(s). In case of a groupcast transmission to a group of UEs, the PSFCH resources used for transmission may be derived from a function of the group ID and/or member ID in the group of UEs.

Under the proposed scheme, the PSFCH may be utilized to carry one or multiple bits for a "non-preferred" indication regarding the reserved resource(s). In case of one bit being used, the "non-preferred" indication may correspond to a second resource indicated in the SCI (e.g., the first reserved resource). Alternatively, the "non-preferred" indication may correspond to all resources indicated in the SCI. In this case, some rules may be derived to determine the setting. For instance, in case that any one of the reserved resources is not preferred, this one bit may be set and transmitted by the peer Rx UE. On the other hand, in case that all the reserved resources are preferred or acceptable, this bit may not be sent. That is, no transmission of the indication bit may be performed by the peer Rx UE when all of the reserved resources are acceptable/preferred. In case that multiple bits are used for indication, the "non-preferred" indication may correspond to each reserved resource indicated in the SCI. For instance, two bits of the "non-preferred" indication may correspond to the second resource in the SCI (e.g., the first reserved resource) and the third resource in the SCI (e.g., the second reserved resource), respectively.

Under the proposed scheme, the transmission timing of the "non-preferred" indication may be the same as the timing of A/N transmission (corresponding to the received SCI and data from the peer Tx UE) in case that the multiplexing is (pre-)configured. Alternatively, the "non-preferred" indication may be sent on its own timing (e.g., x slots before the time instant of the reserved resource(s), with x being the processing time at the peer Tx UE for processing of the received indication and performing resource re-selection as necessary). Alternatively, the A/N transmission may be multiplexed with the "non-preferred" indication for transmission but may follow the timing of the "non-preferred" indication (e.g., y slots before the time instant of the reserved resource(s), with y being the processing time at the peer Tx UE for processing of the received indication, performing resource re-selection as necessary, processing of A/N bit, and preparation of retransmission or new transmission). It is noteworthy that the values of x and y may be the same or different, which may be set by (pre-)configuration.

Under the proposed scheme, upon reception of the SCI and data from the peer Tx UE, the peer Rx UE may be triggered to perform the indication transmission (to indicate that the reserved resource(s) is/are not preferred) in an event that the reserved resource(s) is/are deemed as "non-preferred". Additionally, there may be a delay budget for the transmission of the "non-preferred" indication (e.g., x or y slots before the reserved resource(s)). In case that the delay budget is exceeded, the peer Rx UE may drop or otherwise cancel the transmission of the indication.

Under the proposed scheme, in Step 2B, in case that the reserved resource(s) is/are deemed as "acceptable" or "preferred", the peer Rx UE may send SCI(s) (e.g., first SCI and/or second SCI) with or without any associated data (e.g., dummy data) targeting to one or more other Tx UEs. The SCI(s) may at least carry resource reservation information, priority information and/or source UE ID information obtained from SCI(s) of the peer Tx UE. For instance, the first SCI may be utilized to carry the resource reservation information and the priority information obtained from a first SCI of the peer Tx UE. The second SCI may be utilized to carry the source ID of the peer Tx UE (rather than the source ID of the peer Rx UE) in the field of source UE ID. This may result in an appearance of forwarding of the SCI from the peer Tx UE for a larger coverage so as to avoid the hidden node problem. Additionally, the peer Rx UE may include additional resource reservation information in the SCI if/when necessary. In such cases, the peer Rx UE may use its own UE ID as the source UE ID in the second SCI. There may or may not be dummy data associated with the SCI transmission.

Under the proposed scheme, upon reception of the SCI and data from the peer Tx UE, the peer Rx UE may be triggered to perform SCI transmission in case that the reserved resource(s) is/are deemed as "acceptable" or "preferred". Additionally, there may be a delay budget for the transmission of the SCI (e.g., x or y slots before the reserved resource(s)). In case that the delay budget is exceeded, the peer Rx UE may drop or otherwise cancel the transmission of the SCI with or without any data (e.g., dummy data).

Under the proposed scheme, in Step 3A, upon reception of the "non-preferred" indication from the peer Rx UE (as described above with respect to Step 2A), the peer Tx UE may be triggered to perform resource re-selection in order to avoid using the resource(s) deemed as "non-preferred" by the peer Rx UE.

Under the proposed scheme, in Step 3B-2, upon reception of the SCI(s) with or without data (e.g., dummy data) in Step 2B as described above, the peer Tx UE may determine that the reservation indicated in the SCI is its own reservation according to the source UE ID (e.g., source UE ID is same as the peer Tx UE's ID). Accordingly, the corresponding reception and/or transmission may be skipped, dropped or otherwise ignored by the peer Tx UE so as to avoid confusion of resource selection.

Under the proposed scheme, in Step 3B-1, upon reception of the SCI(s) with or without data (e.g., dummy data) in Step 2B as described above, one or more other Tx UEs (or potential interfering UE(s)) may receive the SCI(s) from the peer Rx UE and perform sensing. Accordingly, each of the one or more other Tx UEs (or potential interfering UE(s)) may take into account its sensing results (e.g., the resource reservation and channel priority of the peer Tx UE forwarded by the peer Rx UE, as well as RSRP performance of the peer Rx UE) in performing resource selection. Advantageously, this may avoid collision with transmission by the peer Tx UE transmission and may improve the performance by avoidance of the hidden node problem. Moreover, in view of the above, it can be seen that the peer Rx UE may be considered as an assisting UE in that the peer Rx UE assists the resource (re-)selection by the peer Tx UE and also by the other Tx UE(s) (or potential interfering UE(s)).

Under a proposed scheme in accordance with the present disclosure, each UE in network environment 100 (e.g., the peer Tx UE and/or other Tx UE(s)) may perform sensing for resource (re-)selection based on a traffic type and/or resource reservation information by taking into account its own power consumption. In case that the traffic type is periodic traffic with known packet arrival time and/or in case that the (periodic or aperiodic) resource has been reserved by SCI (and/or selected by the UE but not reserved), the UE may perform sensing before a time instant that is reserved (and/or selected by UE) and/or a packet arrival time. In case that the traffic type is aperiodic traffic with unknown packet arrival time and/or in case that the resource has not been reserved by SCI (and/or selected by UE), the UE may perform sensing after packet arrival. Moreover, a higher layer may indicate the traffic type or reservation type such that the UE may determine whether to perform prior sensing (e.g., sensing before packet arrival) or post sensing (e.g., sensing after packet arrival).

Illustrative Implementations

Figure 2:
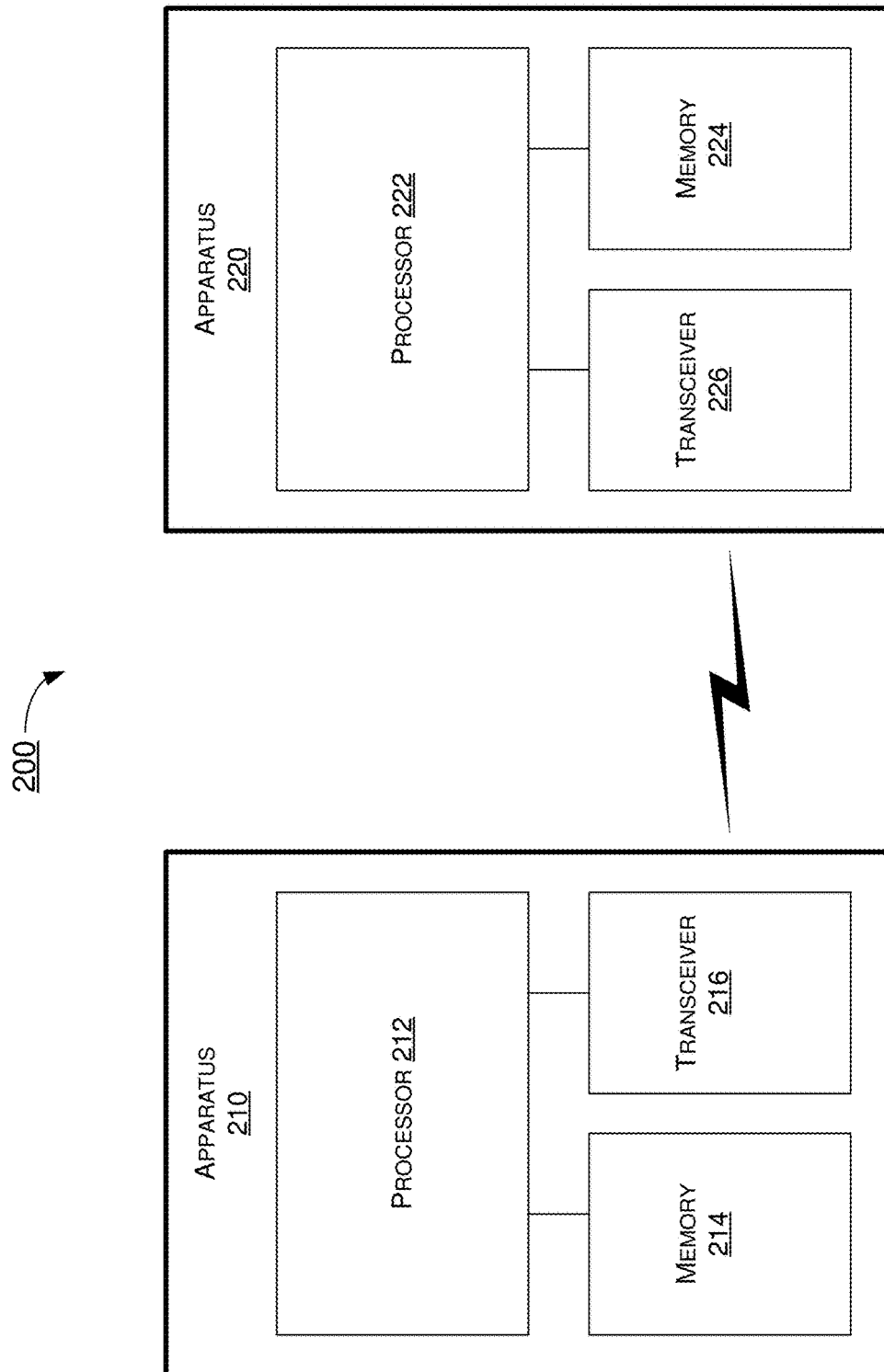
FIG. 2 is a block diagram of an example communication system in which various proposed schemes in accordance with the present disclosure may be implemented.

FIG. 2 illustrates an example communication system 200 having an example apparatus 210 and an example apparatus 220 in accordance with an implementation of the present disclosure. Each of apparatus 210 and apparatus 220 may perform various functions to implement schemes, techniques, processes and methods described herein pertaining to resource allocation enhancements for SL communications in NR V2X communications, including various schemes described herein.

Each of apparatus 210 and apparatus 220 may be a part of an electronic apparatus, which may be a UE such as a vehicle, a portable or mobile apparatus, a wearable apparatus, a wireless communication apparatus or a computing apparatus. For instance, each of apparatus 210 and apparatus 220 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 210 and apparatus 220 may also be a part of a machine type apparatus, which may be an IoT or NB-IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. Alternatively, each of apparatus 210 and apparatus 220 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In some implementations, at least one of apparatus 210 and apparatus 220 may be a part of an electronic apparatus, which may be a vehicle, a roadside unit (RSU), network node or base station (e.g., eNB, gNB or TRP), a small cell, a router or a gateway. For instance, at least one of apparatus 210 and apparatus 220 may be implemented in a vehicle in a V2V or V2X network, an eNodeB in an LTE, LTE-Advanced or LTE-Advanced Pro network or in a gNB in a 5G, NR, IoT or NB-IoT network. Alternatively, at least one of apparatus 210 and apparatus 220 may be implemented in the form of one or more IC chips such as, for example and without limitation, one or more single-core processors, one or more multi-core processors, one or more RISC processors, or one or more CISC processors.

In one aspect, each of processor 212 and processor 222 may be implemented in the form of one or more single-core processors, one or more multi-core processors, one or more RISC processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including resource allocation enhancements for SL communications in NR V2X communications in accordance with various implementations of the present disclosure.

In some implementations, apparatus 210 may also include a transceiver 216, as a communication device, coupled to processor 212 and capable of wirelessly transmitting and receiving data. In some implementations, apparatus 210 may further include a memory 214 coupled to processor 212 and capable of being accessed by processor 212 and storing data therein. In some implementations, apparatus 220 may also include a transceiver 226, as a communication device, coupled to processor 222 and capable of wirelessly transmitting and receiving data. In some implementations, apparatus 220 may further include a memory 224 coupled to processor 222 and capable of being accessed by processor 222 and storing data therein. Accordingly, apparatus 210 and apparatus 220 may wirelessly communicate with each other via transceiver 216 and transceiver 226, respectively.

To aid better understanding, the following description of the operations, functionalities and capabilities of each of apparatus 210 and apparatus 220 is provided in the context of a NR V2X communication environment in which apparatus 210 is implemented in or as a wireless communication device, a communication apparatus or a first UE (e.g., peer Tx UE in network environment 100) and apparatus 220 as a wireless communication device, a communication apparatus or a second UE (e.g., peer Rx UE in network environment 100).

Under a proposed scheme pertaining to resource allocation enhancements for SL communications in NR V2X communications in accordance with the present disclosure, processor 222 of apparatus 220 may receive, via transceiver 226, from apparatus 210 as a peer UE (e.g., peer Tx UE) an SCI signal indicating a reserved resource. Additionally, processor 222 may determine whether the reserved resource is acceptable by performing a RSRP-based comparison. Moreover, processor 222 may perform, via transceiver 226, a transmission to either the peer UE or one or more other UEs depending on a result of the determining.

In some implementations, in performing the transmission, responsive to the reserved resource being determined to be unacceptable according to the RSRP-based comparison, processor 222 may transmit to the peer UE an indication that the reserved resource is not preferred. In some implementations, the indication may include one or more bits carried in a PSFCH.

In some implementations, in performing the transmission, responsive to the reserved resource being determined to be acceptable according to the RSRP-based comparison, processor 222 may transmit to the one or more other UEs one or more SCI signals indicating assistance information comprising one or more of the following: resource reservation information, priority information, and a source UE ID. In some implementations, PSFCH resources used in transmitting the one or more SCI signals may be determined by either or both of the source UE ID and a destination UE ID.

In some implementations, in performing the RSRP-based comparison, processor 222 may perform certain operations. For instance processor 222 may determine a first value based on a first RSRP of the peer UE measured on the reserved resource and a first RSRP offset. Additionally, processor 222 may determine a second value based on a second RSRP of a potential interfering UE measured on the reserved resource and a second RSRP offset. Moreover, processor 222 may compare the first value and the second value. In some implementations, the reserved resource may be determined to be acceptable responsive to the first value being greater than the second value. Conversely, the reserved resource may be determined to be unacceptable responsive to the second value being greater than the first value. In some implementations, values of the first and the second RSRP offsets may be derived from priority levels of the peer UE and the potential interfering UE.

Under another proposed scheme pertaining to resource allocation enhancements for SL communications in NR V2X communications in accordance with the present disclosure, processor 212 of apparatus 210 may transmit, via transceiver 216, to apparatus 220 as a peer UE (e.g., peer Rx UE) an SCI signal indicating a reserved resource. Moreover, processor 212 may receive, via transceiver 216, from the peer UE an indication that the reserved resource is not preferred. Furthermore, processor 212 may perform, via transceiver 216, resource selection or reselection responsive to receiving the indication.

In some implementations, the indication may include one or more bits carried in a PSFCH.

In some implementations, in performing the resource selection or reselection, processor 212 may perform channel sensing based on either or both of a traffic type and resource reservation information.

In some implementations, responsive to the traffic type being periodic traffic, the performing of the channel sensing may involve processor 212 performing the channel sensing before a time of packet arrival. Otherwise, responsive to the traffic type being aperiodic traffic, the performing of the channel sensing may involve processor 212 performing the channel sensing after the time of packet arrival.

Illustrative Processes

Figure 3:
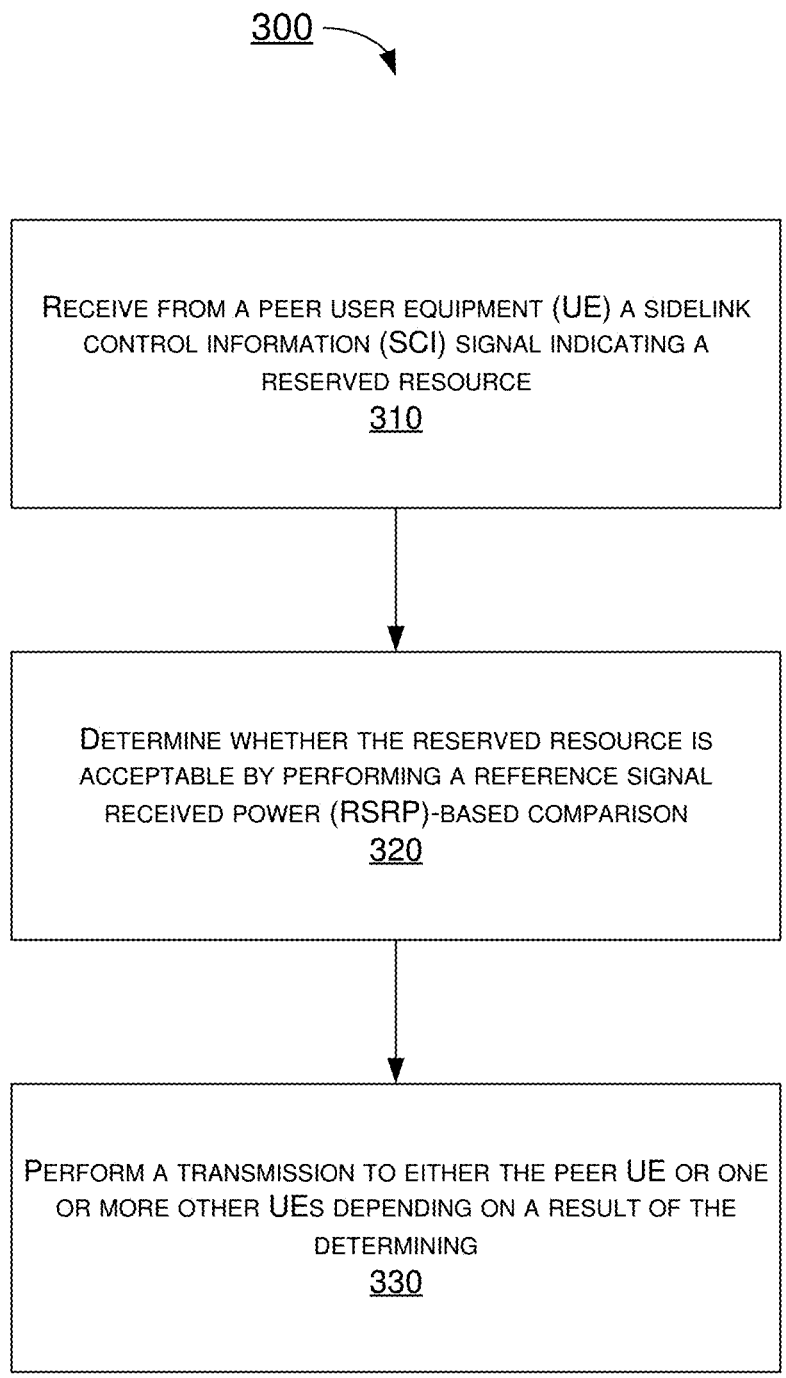
FIG. 3 is a flowchart of an example process under a proposed scheme in accordance with an implementation of the present disclosure.

FIG. 3 illustrates an example process 300 in accordance with an implementation of the present disclosure. Process 300 may be an example implementation of the proposed schemes described above with respect to resource allocation enhancements for SL communications in NR V2X communications in accordance with the present disclosure. Process 300 may represent an aspect of implementation of features of apparatus 210 and apparatus 220. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may also be repeated partially or entirely. Process 300 may be implemented by apparatus 210, apparatus 220 and/or any suitable wireless communication device, UE, roadside unit (RUS), base station or machine type devices. Solely for illustrative purposes and without limitation, process 300 is described below in the context of apparatus 210 as a first UE (e.g., peer Tx UE in network environment 100) and apparatus 220 as a second UE (e.g., peer Rx UE in network environment 100). Process 300 may begin at block 310.

At block 310, process 300 may involve processor 222 of apparatus 220 receiving, via transceiver 226, from apparatus 210 as a peer UE (e.g., peer Tx UE) an SCI signal indicating a reserved resource. Process 300 may proceed from block 310 to block 320.

At block 320, process 300 may involve processor 222 determining whether the reserved resource is acceptable by performing a RSRP-based comparison. Process 300 may proceed from block 320 to block 330.

At block 330, process 300 may involve processor 222 performing, via transceiver 226, a transmission to either the peer UE or one or more other UEs depending on a result of the determining.

In some implementations, in performing the transmission, responsive to the reserved resource being determined to be unacceptable according to the RSRP-based comparison, process 300 may involve processor 222 transmitting to the peer UE an indication that the reserved resource is not preferred. In some implementations, the indication may include one or more bits carried in a PSFCH.

In some implementations, in performing the transmission, responsive to the reserved resource being determined to be acceptable according to the RSRP-based comparison, process 300 may involve processor 222 transmitting to the one or more other UEs one or more SCI signals indicating assistance information comprising one or more of the following: resource reservation information, priority information, and a source UE ID. In some implementations, PSFCH resources used in transmitting the one or more SCI signals may be determined by either or both of the source UE ID and a destination UE ID.

In some implementations, in performing the RSRP-based comparison, process 300 may involve processor 222 performing certain operations. For instance, process 300 may involve processor 222 determining a first value based on a first RSRP of the peer UE measured on the reserved resource and a first RSRP offset. Additionally, process 300 may involve processor 222 determining a second value between a second RSRP of a potential interfering UE measured on the reserved resource and a second RSRP offset. Moreover, process 300 may involve processor 222 comparing the first value and the second value. In some implementations, the reserved resource may be determined to be acceptable responsive to the first value being greater than the second value. Conversely, the reserved resource may be determined to be unacceptable responsive to the second value being greater than the first value. In some implementations, values of the first and the second RSRP offsets may be derived from priority levels of the peer UE and the potential interfering UE.

Figure 4:
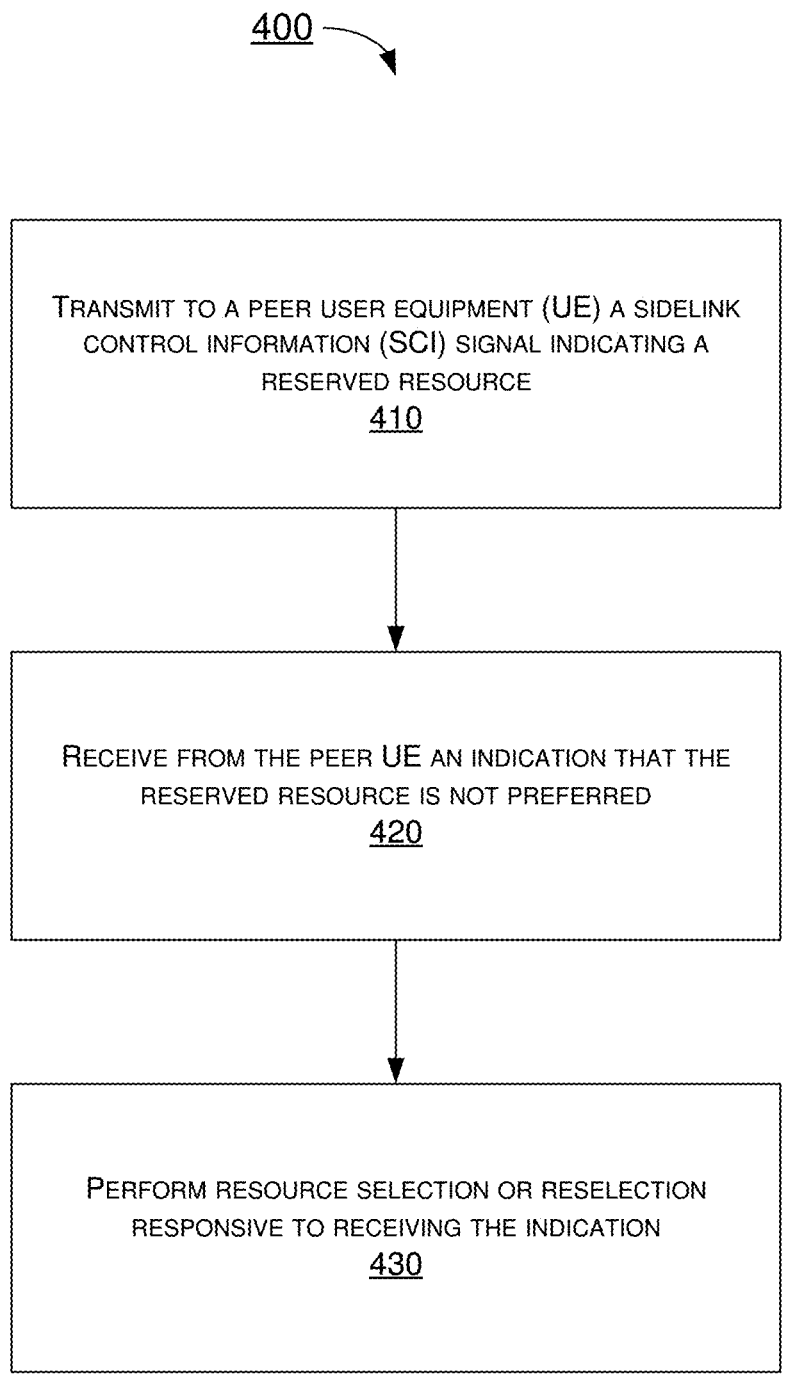
FIG. 4 is a flowchart of an example process under a proposed scheme in accordance with an implementation of the present disclosure.

FIG. 4 illustrates an example process 400 in accordance with an implementation of the present disclosure. Process 400 may be an example implementation of the proposed schemes described above with respect to resource allocation enhancements for SL communications in NR V2X communications in accordance with the present disclosure. Process 400 may represent an aspect of implementation of features of apparatus 210 and apparatus 220. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 210, apparatus 220 and/or any suitable wireless communication device, UE, RUS, base station or machine type devices. Solely for illustrative purposes and without limitation, process 400 is described below in the context of apparatus 210 as a first UE (e.g., peer Tx UE in network environment 100) and apparatus 220 as a second UE (e.g., peer Rx UE in network environment 100). Process 400 may begin at block 410.

At block 410, process 400 may involve processor 212 of apparatus 210 transmitting, via transceiver 216, to apparatus 220 as a peer UE (e.g., peer Rx UE) an SCI signal indicating a reserved resource. Process 400 may proceed from block 410 to block 420.

At block 420, process 400 may involve processor 212 receiving, via transceiver 216, from the peer UE an indication that the reserved resource is not preferred. Process 400 may proceed from block 420 to block 430.

At block 430, process 400 may involve processor 212 performing, via transceiver 216, resource selection or reselection responsive to receiving the indication.

In some implementations, the indication may include one or more bits carried in a PSFCH.

In some implementations, in performing the resource selection or reselection, process 400 may involve processor 212 performing channel sensing based on either or both of a traffic type and resource reservation information.

In some implementations, responsive to the traffic type being periodic traffic, the performing of the channel sensing may involve processor 212 performing the channel sensing before a time of packet arrival. Otherwise, responsive to the traffic type being aperiodic traffic, the performing of the channel sensing may involve processor 212 performing the channel sensing after the time of packet arrival.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc". is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc". is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving from a peer user equipment (UE) a sidelink control information (SCI) signal indicating a reserved resource;
   determining whether the reserved resource is acceptable by performing a reference signal received power (RSRP)-based comparison, to assist the peer UE in resource selection by the peer UE; and
   performing a transmission to either the peer UE or one or more other UEs respectively depending on a result of the determining,
   wherein the performing of the RSRP-based comparison comprises:
   determining a first value based on a first RSRP of the peer UE measured on the reserved resource and a first RSRP offset:
   determining a second value based on a second RSRP of the potential interfering UE measured on the reserved resource and a second RSRP offset; and
   comparing the first value and the second value.

2. The method of claim 1, wherein the performing of the transmission comprises, responsive to the reserved resource being determined to be unacceptable according to the RSRP-based comparison, transmitting to the peer UE an indication that the reserved resource is not preferred.

3. The method of claim 2, wherein the indication comprises one or more bits carried in a physical sidelink feedback channel (PSFCH).

4. The method of claim 1, wherein the performing of the transmission comprises, responsive to the reserved resource being determined to be acceptable according to the RSRP-based comparison, transmitting to the one or more other UEs one or more SCI signals indicating assistance information comprising resource reservation information, priority information, or a source UE identification (ID), or a combination thereof.

5. The method of claim 4, wherein physical sidelink feedback channel (PSFCH) resources used in transmitting the one or more SCI signals are determined by either or both of the source UE ID and a destination UE ID.

6. The method of claim 1, wherein the reserved resource is determined to be acceptable responsive to the first value being greater than the second value, and wherein the reserved resource is determined to be unacceptable responsive to the second value being greater than the first value.

7. The method of claim 1, wherein values of the first and the second RSRP offsets are derived from the priority levels of the peer UE transmission and the potential interfering UE transmission.

8. An apparatus, comprising:
   a transceiver configured to communicate wirelessly; and
   a processor coupled to the transceiver and configured to perform operations comprising:
   receiving, via the transceiver, from a peer user equipment (UE) a sidelink control information (SCI) signal indicating a reserved resource;
   determining whether the reserved resource is acceptable by performing a reference signal received power (RSRP)-based comparison, to assist the peer UE in resource selection by the peer UE; and
   performing, via the transceiver, a transmission to either the peer UE or one or more other UEs respectively depending on a result of the determining,
   wherein, in performing the RSRP-based comparison, the processor is configured to perform operations comprising:
   determining a first value based on a first RSRP of the peer UE measured on the reserved resource and a first RSRP offset;
   determining a second value based on a second RSRP of the potential interfering UE measured on the reserved resource and a second RSRP offset; and
   comparing the first value and the second value.

9. The apparatus of claim 8, wherein, in performing the transmission, responsive to the reserved resource being determined to be unacceptable according to the RSRP-based comparison, the processor is configured to transmit to the peer UE an indication that the reserved resource is not preferred.

10. The apparatus of claim 9, wherein the indication comprises one or more bits carried in a physical sidelink feedback channel (PSFCH).

11. The apparatus of claim 8, wherein, in performing the transmission, responsive to the reserved resource being determined to be acceptable according to the RSRP- based comparison, the processor is configured to transmit to the one or more other UEs one or more SCI signals indicating assistance information comprising resource reservation information, priority information, or a source UE identification (ID), or a combination thereof.

12. The apparatus of claim 11, wherein physical sidelink feedback channel (PSFCH) resources used in transmitting the one or more SCI signals are determined by either or both of the source UE ID and a destination UE ID.

13. The apparatus of claim 8, wherein the reserved resource is determined to be acceptable responsive to the first value being greater than the second value, and wherein the reserved resource is determined to be unacceptable responsive to the second value being greater than the first value.

14. The apparatus of claim 8, wherein values of the first and the second RSRP offsets are derived from the priority levels of the peer UE transmission and the potential interfering UE transmission.

* * * * *